US012579218B2

(12) United States Patent
Jaiswal et al.

(10) Patent No.: US 12,579,218 B2

(45) Date of Patent: Mar. 17, 2026

(54) COMPUTER SYSTEMS, METHODS, AND NON-TRANSITORY COMPUTER-READABLE STORAGE DEVICES FOR GENERATING PROACTIVE ADVISOR RECOMMENDATION USING ARTIFICIAL INTELLIGENCE

(71) Applicant: Royal Bank of Canada, Toronto (CA)

(72) Inventors: Vishal Rakesh Jaiswal, Halifax (CA); Shashwat Regmi, Surrey (CA); Sujina Bhadravathi Halesh, Fredericton (CA); Jason Fernandes, Toronto (CA); Matthew Sherman, Toronto (CA); Manish Shah, Toronto (CA); Venkatesh Loganathan, Toronto (CA); Aharon Kagedan, Toronto (CA); Lior Velichover, Toronto (CA); Martin Wildberger, Toronto (CA); Michael Palmer, Toronto (CA)

(73) Assignee: Royal Bank of Canada, Toronto (CA)

( * ) Notice: Subject to any disclaimer, the term of this patent is extended or adjusted under 35 U.S.C. 154(b) by 0 days.

(21) Appl. No.: 18/237,191

(22) Filed: Aug. 23, 2023

(65) Prior Publication Data

US 2024/0070231 A1 Feb. 29, 2024

Related U.S. Application Data

(60) Provisional application No. 63/400,647, filed on Aug. 24, 2022.

(51) Int. Cl.
| | | |
|---|---|---|
| *G06F 18/23* | (2023.01) | |
| *G06F 18/23213* | (2023.01) | |
| *G06Q 40/02* | (2023.01) | |

(52) U.S. Cl.
CPC ....... *G06F 18/23213* (2023.01); *G06Q 40/02* (2013.01); *G06Q 40/022* (2025.08)

(58) Field of Classification Search
CPC . G06F 18/23213; G06Q 40/02; G06Q 40/022
See application file for complete search history.

(56) References Cited

U.S. PATENT DOCUMENTS

| | | | |
|---|---|---|---|
| 2017/0098012 A1* | 4/2017 | Zhu | G06F 16/24578 |
| 2022/0027983 A1* | 1/2022 | Ben David | G06Q 40/03 |
| 2022/0180119 A1* | 6/2022 | Kelton | G06V 10/762 |
| 2022/0405775 A1* | 12/2022 | Siebel | G06Q 30/0201 |
| 2023/0004999 A1* | 1/2023 | Sahasi | H04L 67/30 |

\* cited by examiner

*Primary Examiner* — Scott C Anderson

(57) ABSTRACT

Computer systems, apparatuses, processors, and non-transitory computer-readable storage devices configured for executing a method for generating proactive advisor recommendation using artificial intelligence. The method has the steps of: partitioning a plurality of clients using a clustering model based on data of the plurality of clients for clustering the plurality of clients into a plurality of client clusters; classifying the clients of at least a first client cluster of the plurality of client clusters into a plurality of client classifications by using one or more random-forest classifiers; and generating financial recommendations for the clients of at least a first client classification of the plurality of client classifications.

17 Claims, 12 Drawing Sheets

312

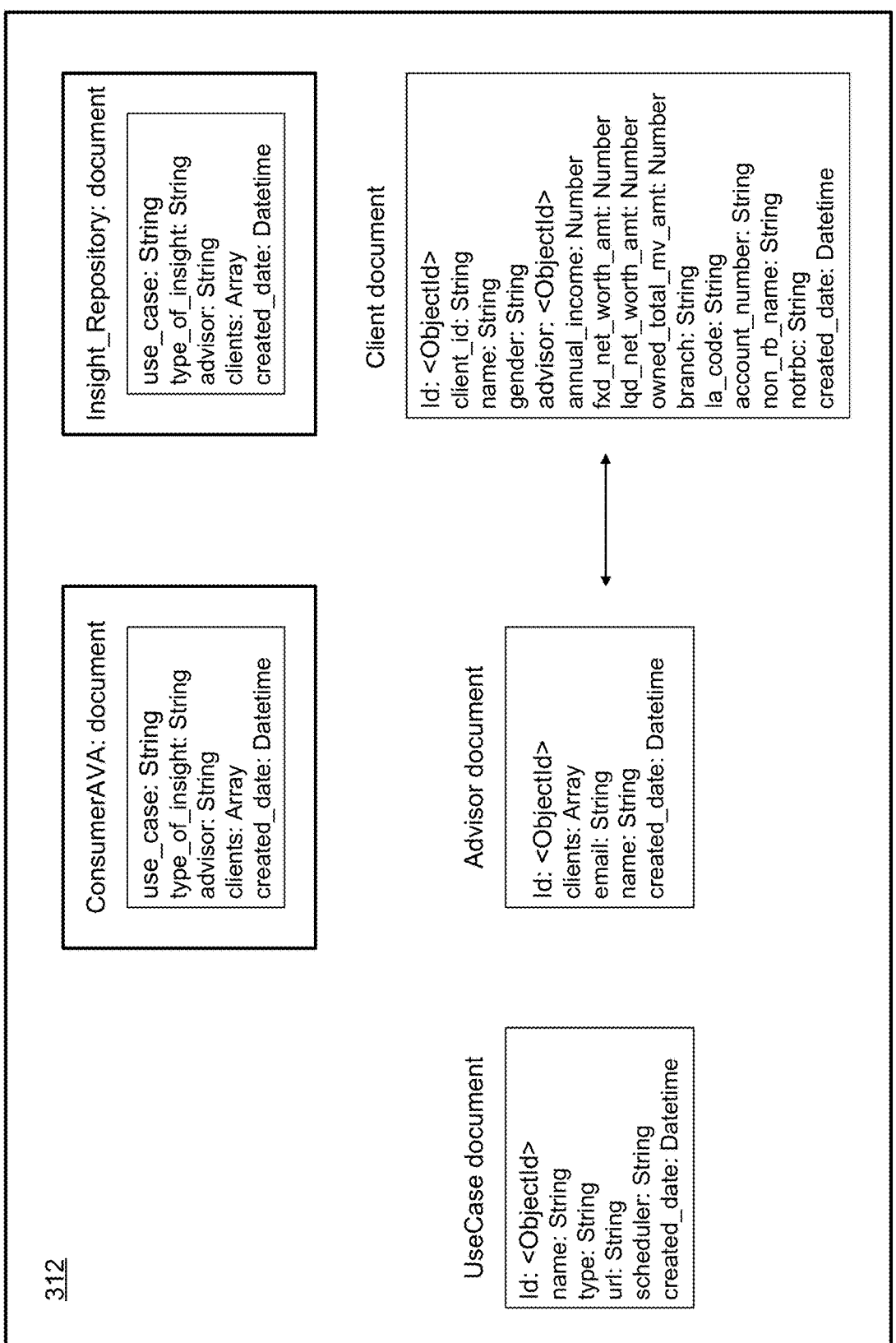

Insight_Repository: document use_case: String
type_of_insight: String
advisor: String
clients: Array
created_date: Datetime Client document Id: <ObjectId>
client_id: String
name: String
gender: String
advisor: <ObjectId>
annual_income: Number
fxd_net_worth_amt: Number
lqd_net_worth_amt: Number
owned_total_mv_amt: Number
branch: String
la_code: String
account_number: String
non_rb_name: String
notrbc: String
created_date: Datetime ConsumerAVA: document use_case: String
type_of_insight: String
advisor: String
clients: Array
created_date: Datetime Advisor document Id: <ObjectId>
clients: Array
email: String
name: String
created_date: Datetime UseCase document Id: <ObjectId>
name: String
type: String
url: String
scheduler: String
created_date: Datetime

FIG. 7

Sign In

Username * advisor@rbc.com

Password *

••••••••

Sign in

Help

COMPUTER SYSTEMS, METHODS, AND NON-TRANSITORY COMPUTER-READABLE STORAGE DEVICES FOR GENERATING PROACTIVE ADVISOR RECOMMENDATION USING ARTIFICIAL INTELLIGENCE

CROSS-REFERENCE TO RELATED APPLICATIONS

This application claims the benefit of U.S. Provisional Patent Application Ser. No. 63/400,647, filed Aug. 24, 2022, the content of which is incorporated herein by reference in its entirety.

TECHNICAL FIELD

The present disclosure relates generally to computer systems, methods, and non-transitory computer-readable storage devices, and in particular to computer systems, methods, and non-transitory computer-readable storage devices for generating proactive advisor recommendation using artificial intelligence.

BACKGROUND

Wealth management generally involves a large number of financial data of various clients in various financial fields. Conventionally, wealth management is usually conducted manually by financial experts.

Computer systems have been used in wealth management. However, in prior art, computer systems are usually used in response to clients' requests to analyze clients' financial data for generating advisor recommendations. Such a wealth-management method, although computerized, is a reactive method.

On the other hand, a proactive wealth-management method is to proactively analyze various clients' financial data for determining clients' potential financial needs and generating advisor recommendations before a client request is received. However, when there exist a large number of clients and a large amount of financial data, the conventional wealth-management computer systems and the conventional computerized wealth-management methods may not be able to analyze clients' financial data and generate advisor recommendations in a timely manner and therefore cannot meet the clients' wealth-management needs.

SUMMARY

According to one aspect of this disclosure, there is provided a computerized method comprising: partitioning a plurality of clients using a clustering model based on data of the plurality of clients for clustering the plurality of clients into a plurality of client clusters; classifying the clients of at least a first client cluster of the plurality of client clusters into a plurality of client classifications by using one or more random-forest classifiers for classifying the clients of the at least first client cluster; and generating financial recommendations for the clients of at least a first client classification of the plurality of client classifications.

In some embodiments, each of the one or more random-forest classifiers corresponds to a financial-solution category.

In some embodiments, the clustering model comprises a k-means clustering method.

In some embodiments, the clustering model comprises an elbow method for obtaining cluster information and obtaining a k value for the k-means clustering method.

In some embodiments, the clustering model is configured for partitioning the plurality of clients into two client clusters.

In some embodiments, the first client cluster comprises potential clients of financial solutions.

In some embodiments, said classifying the clients of the at least first client cluster comprises: classifying the clients of the first client cluster into a first client classification and a second client classification by using the one or more random-forest classifiers.

In some embodiments, said classifying the clients of the at least first client cluster comprises: using each of the one or more random-forest classifiers to classify the clients of the first client cluster into the first client classification and the second client classification; and the first client classification comprises potential clients for the corresponding banking-solution category, and the second client classification comprises potential clients not ready for the corresponding banking-solution category.

In some embodiments, the one or more random-forest classifiers comprises at least three random-forest classifiers of a personal banking category, a premier banking category, and a regular banking category, respectively.

In some embodiments, said classifying the clients of the at least first client cluster of the plurality of client clusters comprises: classifying the clients of the at least first client cluster of the plurality of client clusters into the plurality of client classifications by using a plurality of mutually exclusive random-forest classifiers.

In some embodiments, the computerized method further comprises: repeating the partitioning step, the classifying step, and the generating step according to a schedule.

In some embodiments, the computerized method further comprises: prioritizing the partitioning step, the classifying step, and the generating step.

According to one aspect of this disclosure, there is provided one or more processors for performing the above-described method.

According to one aspect of this disclosure, there is provided one or more non-transitory computer-readable storage devices comprising computer-executable instructions, wherein the instructions, when executed, cause one or more processing units to perform the above-described method.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments:

FIG. 7 is a schematic diagram showing various data structure of the database of the functional architecture shown in FIG. 3;

DETAILED DESCRIPTION

Figure 1:
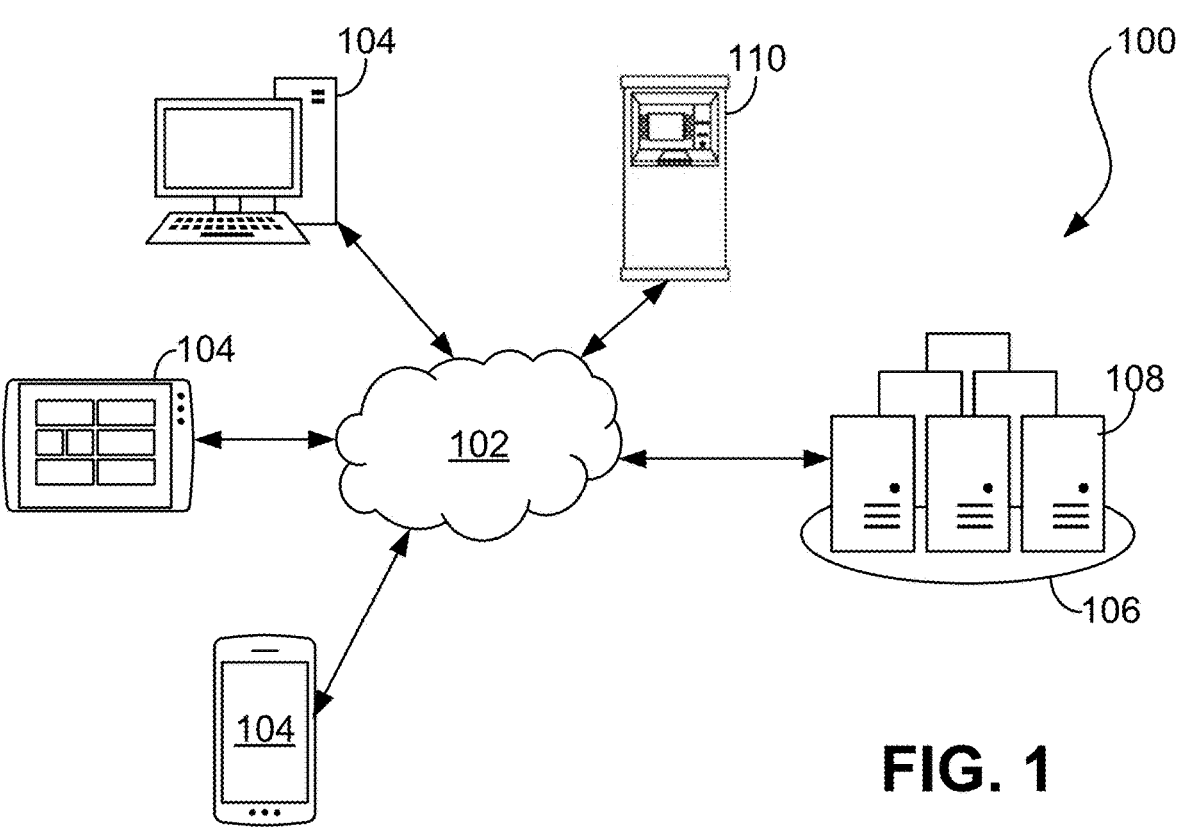
FIG. 1 depicts a computer network system according to some embodiments of this disclosure.

Referring now to FIG. 1, there is shown a computer network system 100 that comprises an example embodiment of a system for analyzing various clients' financial data for determining clients' potential financial needs and generating advisor recommendations (also denoted "insights"). Herein, a "user" refers to a user of the computer network system 100, and a "client" refers to a customer or client of the user or the institute that the user is working therefor.

As shown in FIG. 1, the computer network system 100 comprises a network 102 such as a wide area network 102 (for example, the Internet) to which various user devices 104, an ATM 110, and data center 106 are communicatively coupled. The data center 106 comprises one or more servers 108 networked together to collectively perform various computing functions. For example, in the context of a financial institution such as a bank, the data center 106 may host online banking services that permit users to log in to servers 108 thereof using user accounts that give them access to various computer-implemented banking services, such as online fund transfers. Furthermore, individuals may appear in person at the ATM 110 to withdraw money from bank accounts controlled by the data center 106.

Figure 2:
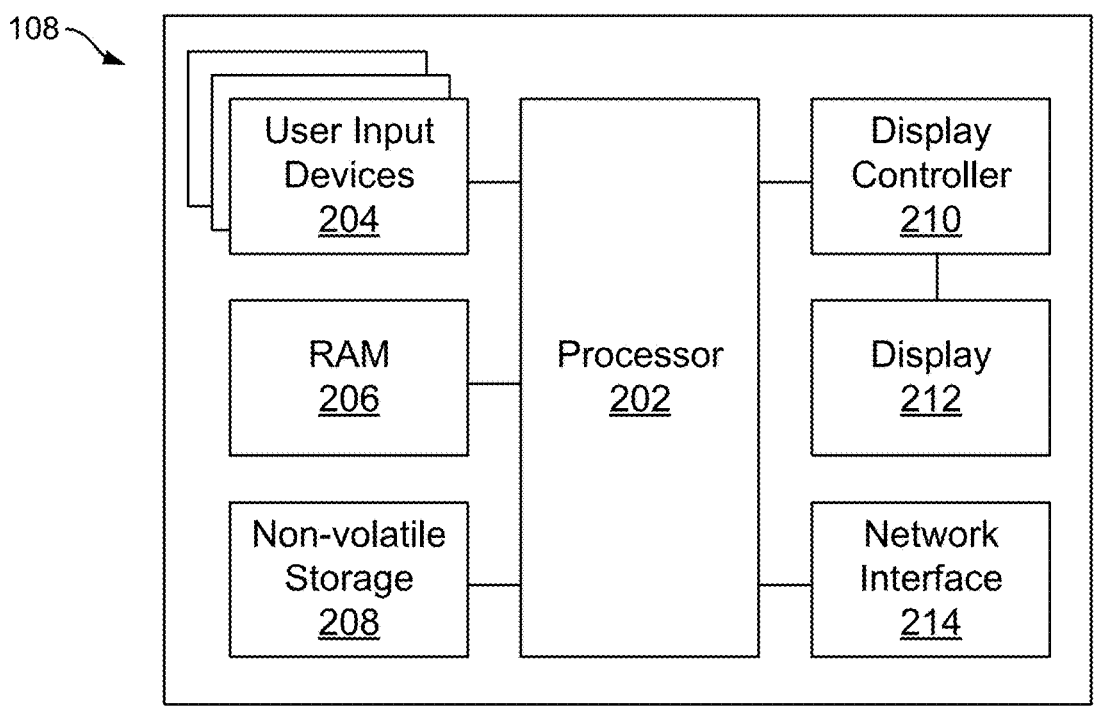
FIG. 2 is a block diagram of a server of the computer network system shown in FIG. 1.

Referring now to FIG. 2, there is depicted an example embodiment of one of the servers 108 of the data center 106. The server 108 comprises one or more processors 202 that control the server's overall operation. The one or more processors 202 are communicatively coupled to and control several subsystems. These subsystems comprise one or more user input devices 204, which may comprise, for example, any one or more of a keyboard, mouse, touch screen, voice control, and/or the like; one or more non-transitory computer-readable storage devices or media 206 such as random access memory ("RAM"), which store computer-executable instructions or program code for execution at runtime by the processor 202; non-transitory, non-volatile, computer-readable storage devices or media 208, which store the computer-executable instructions or program code executed by the RAM 206 at runtime; a display controller 210, which is communicatively coupled to and controls a display 212; and a network interface 214, which facilitates network communications with the wide area network 102 and the other servers 108 in the data center 106. The non-volatile storage 208 has stored on it computer program code that is loaded into the RAM 206 at runtime and that is executable by the processor 202. When the computer program code is executed by the processor 202, the processor 202 causes the server 108 to implement a method for analyzing various clients' financial data for determining clients' potential financial needs and generating advisor recommendations (described in more detail below). Additionally or alternatively, the servers 108 may collectively perform that method using distributed computing. While the system depicted in FIG. 2 is described specifically in respect of one of the servers 108, analogous versions of the system may also be used for the user devices 104.

The processor 202 used in the foregoing embodiments may comprise, for example, a processing unit (such as one or more processors, microprocessors, or programmable logic controllers) or one or more microcontrollers (which comprise both one or more processing units and one or more non-transitory computer readable media). Examples of computer readable media that are non-transitory include disc-based media such as CD-ROMs and DVDs, magnetic media such as hard drives and other forms of magnetic disk storage, semiconductor based media such as flash media, random access memory (including DRAM and SRAM), and read only memory. As an alternative to an implementation that relies on processor-executed computer program code, a hardware-based implementation may be used. For example, an application-specific integrated circuit (ASIC), field programmable gate array (FPGA), system-on-a-chip (SoC), or other suitable type of hardware implementation may be used as an alternative to or to supplement an implementation that relies primarily on a processor executing computer program code stored on a computer medium.

Figure 3:
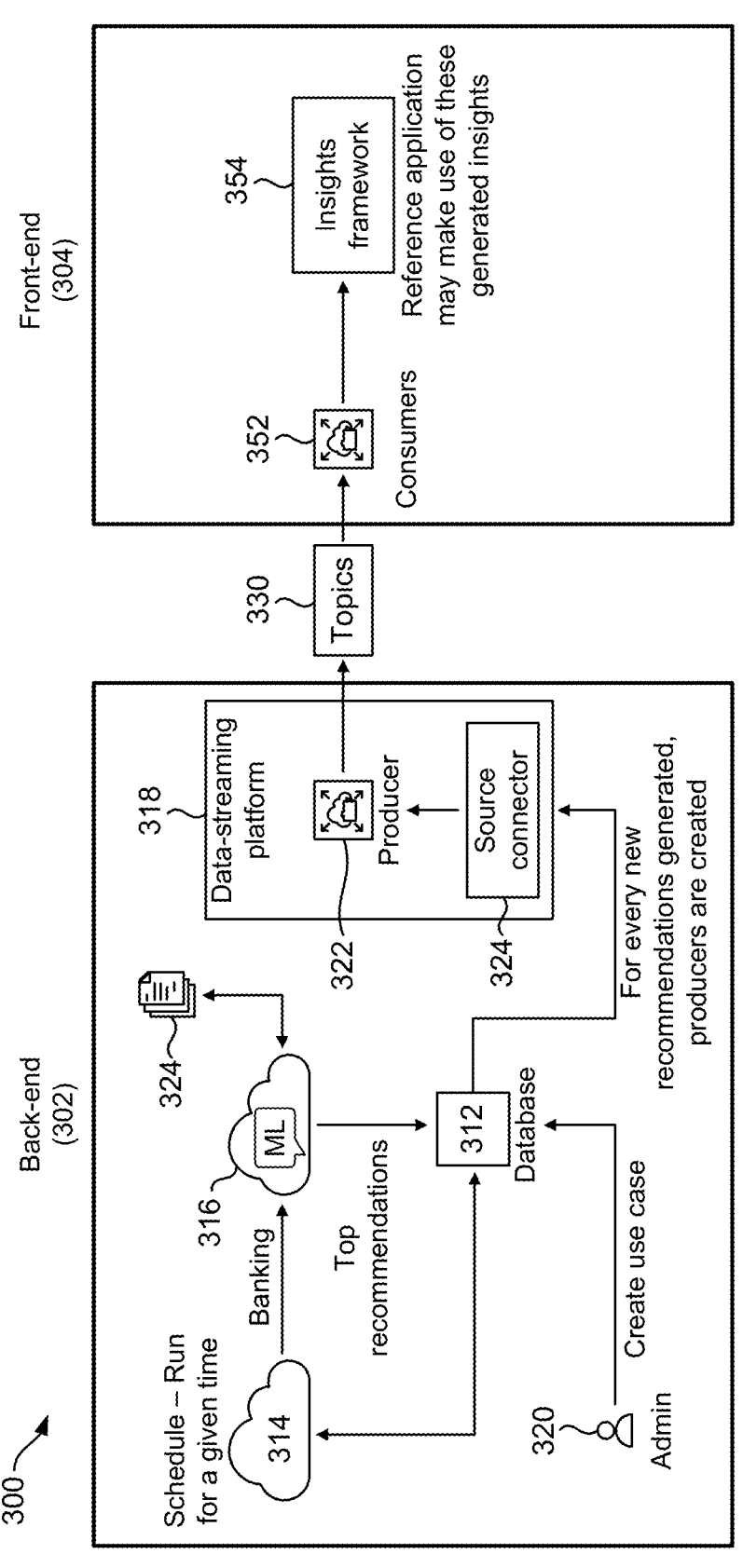
FIG. 3 is a schematic diagram showing a functional architecture of the computer network system shown in FIG. 1.

FIG. 3 is a schematic diagram showing a functional architecture 300 of the computer network system 100, according to some embodiments of this disclosure. As shown, from a functional point of view, the computer network system 100 comprises a back-end 302 operating on the data center 106 (or more specifically, operating on the servers 108 thereof) and a front-end 304 with a portion thereof generally operating on user devices 104 for querying the advisor recommendations, and another portion thereof generally operating on one or more servers (such as the servers 108 of the data center 106 or third-party servers) for providing the queried advisor recommendations to the user devices 104.

The back-end 302 comprises a database 312 connected with a scheduler 314, an artificial intelligence (AI) engine 316 such as a machine learning (ML) engine, and a stream-processing platform 318.

The database 312 may be any suitable database. In these embodiments, the database 312 is a NoSQL database such as MongoDB offered by MongoDB Inc. of New York, USA, for handling highly unstructured data used on the computer network system 100.

The database 312 stores various data such as the financial data of various clients, clients' information, analytical results of the financial data, advisor recommendations, and/or the like. The database 312 also stores various use cases generated by a user 320 such as an administrator.

Herein, a "use case" refers to a data category of a collection of data and may also refer to the collection of data in the data category. For example, a tax-free savings account (TFSA) use case may provide the contribution-room data about the clients.

The user 320 may generate a use case for the data stored in the database 312, and the ML engine 316 may generate an insight for the use case. In these embodiments, the use cases and insights are stored in the database 312.

Figure 4:
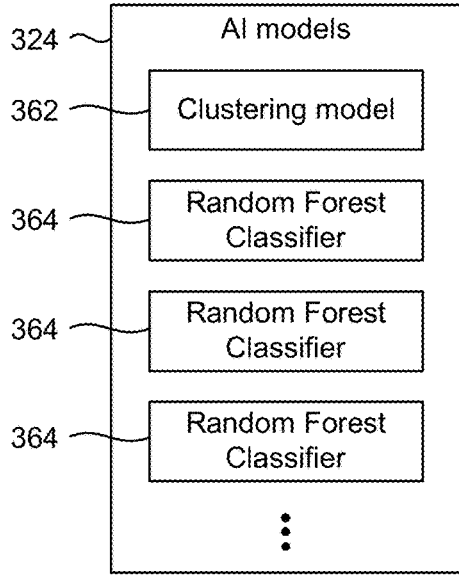
FIG. 4 is a schematic diagram showing a plurality of AI models used by the computer network system shown in FIG. 1.

The ML engine 316 comprises a plurality of AI models 324. As shown in FIG. 4, the AI models 324 in these embodiments comprises a clustering model 362 and a plurality of random-forest classifiers 364 each corresponding to a financial-solution category.

In these embodiments, the clustering model 362 uses a k-means clustering method for grouping various clients into clusters. Then, the random-forest classifiers 364 are used to further classify the client clusters and identify clients potentially fitting into various financial categories, for generating the insights.

As those skilled in the art will appreciate, the data stored in the database 312 may be constantly updated. Therefore, the scheduler 314 is used for scheduling the ML engine 316 to regenerate the insights for the use cases periodically or as needed.

The stream-processing platform 318 is used for communicating with the front-end 304 to access, store, process, and manage data provided by the back-end 302 as continuous, real-time streams under various topics 330 for publishing to users and/or for users to subscribe. The stream-processing platform 318 comprises a source connector 324 for interfacing with the database 312 and a producer 322 for interfacing with the front-end 304. In these embodiments, the stream-processing platform 318 is Confluent Platform offered by Confluent, Inc. of Mountain View, California, USA, based on Apache Kafka® (Kafka is a registered trademark of Apache Software Foundation). As those skilled in the art understand, Apache Kafka® is a distributed event store and stream-processing platform. It facilitates publishing the insights to a common topic (repository) and providing the generated insights to consumer applications.

As described above, the front-end 304 is generally used for querying insights, receiving the queried insights, and presenting the received insights to various users such as financial advisors. In these embodiments, the front-end 304 comprises one or more user modules or programs 352 executed on the user devices 104 for sending queries to the back-end 302 and receiving query results (for example, the insights) therefrom. The front-end 304 also comprises an insights framework 354 for communicating with other systems or platforms (such as third-party systems; not shown) for the users thereof to query the generated insights as needed.

Figure 5:
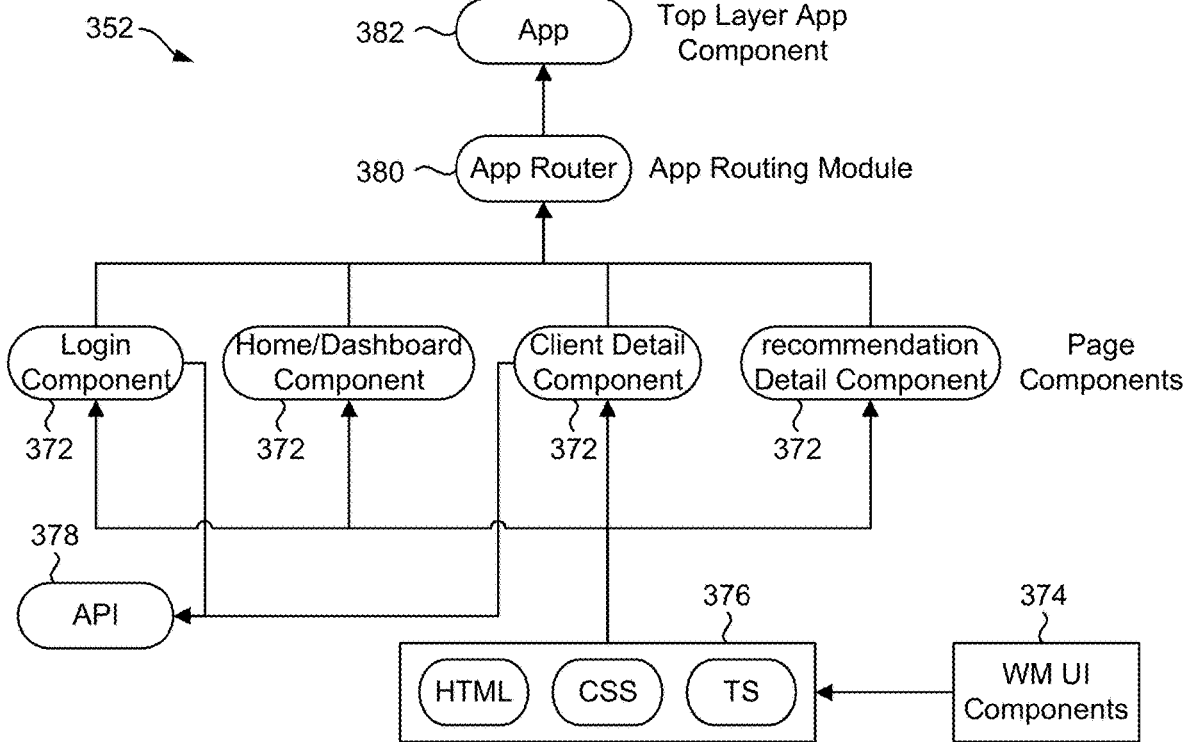
FIG. 5 is a schematic diagram showing the structure of a user module of the functional architecture shown in FIG. 3.

FIG. 5 is a schematic diagram showing the structure of the user module 352. As shown, the user module 352 comprises a plurality of functional components 372 such as a login component, a home/dashboard component, a client-detail component, a recommendation-detail component, and/or the like. The functional components 372 comprises necessary wealth management (WM) and user interface (UI) components 374 prepared using web technologies 376 such as hypertext markup language (HTML), cascading style sheets (CSS), TypeScript (TS), and/or the like, and uses necessary application programming interface (API) 378 for accessing the data-streaming platform 318. The various functional components 372 are called by a user app 382 via an app router 380. In other words, in execution, the app router 380 dynamically connects various functional components 372 to various user apps 382 per the requests or needs of the user apps 382.

Figure 6:
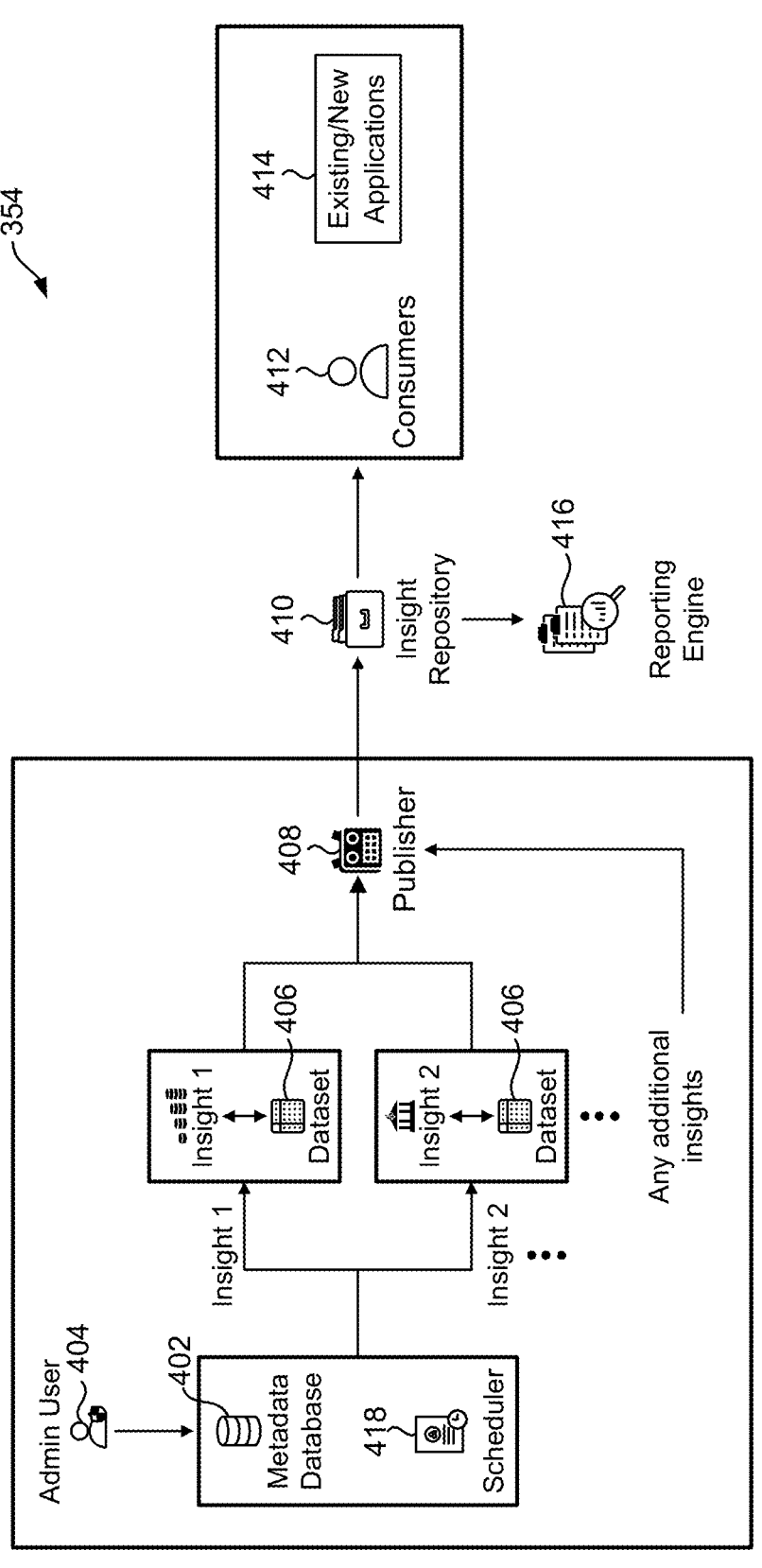
FIG. 6 is a schematic diagram showing the structure of an insights framework of the functional architecture shown in FIG. 3.

FIG. 6 is a schematic diagram showing the structure of the insights framework 354. As shown, the insights framework 354 comprises a metadata database 402 for storing use cases generated or otherwise created by one or more users 404 such as one or more administrators, the insights of the use cases, relevant clients' information, relevant financial data, and/or the like. The insights and related information may be retrieved from the metadata database 402 in the form of datasets 406 and published by a publisher 408 into an insights repository 410 for outputting to consumers or clients 412 and/or other applications 414 such as the Salesforce platforms, the Advisor Virtual Assistant (AVA) (a mobile app developed by Royal Bank of Canada (RBC) to help investment advisors connect with their clients), myGPS™ (a digital web-based tool developed by RBC for Canadian Wealth Management financial planning), and/or the like. A report engine 416 may be used by the publisher 408 for generating suitable reports for consumers 412. In these embodiments, the insights framework 354 also comprises a scheduler 418 for periodically retrieving insights and related data from the database 312 (see FIG. 3).

In addition to the components described above, the computer network system 100 in these embodiments also uses other software modules such as:

Angular: Angular is a web framework offered by Google LLC of Mountain View, California, USA, which is used for the front-end application.

Node.js: Node.js is an open-source, cross-platform, back-end JavaScript runtime environment offered by OpenJS Foundation, which is used in the back-end acting as a representational state transfer (REST) API for receiving requests from the front-end 304, querying the database 312 for relevant data, and serving the data back to the front-end 304.

Python: Python is used as it provides a wide range of libraries to support data engineering and machine learning.

HashiCorp Vault: HashiCorp Vault offered by HashiCorp of San Francisco, California, USA, is a secrets management tool for controlling access to sensitive credentials in a low-trust environment. In these embodiments, HashiCorp Vault is used for secrets storage.

Docker: Docker offered by Docker, Inc. of Palo Alto, California, USA, is a set of platform-as-a-service (PaaS) products using operating system (OS) level virtualization to deliver software in packages (denoted "containers"). In these embodiments, Docker is used for app containerization.

OpenShift: OpenShift is a family of containerization software products offered by Red Hat, Inc. of Raleigh, North Carolina, USA. In these embodiments, OpenShift is used for app deployment to the computer cloud.

FIG. 7 shows various data structure of the database 312. For example, the database 312 may comprise one or more records of a consumer-document data-structure (ConsumerAVA) 422, one or more records of an insight-repository document data-structure 424, one or more records of a use-case document data-structure (UseCase document) 426, one or more records of an advisor document data-structure 428, and/or one or more records of a client-document data-structure 430.

The consumer-document data-structure 422 comprises a plurality of data fields such as (listed below in the form of "field name: data type"):

use_case: String
    type_of_insight: String
    advisor: String
    clients: Array
    created_date: Datetime The insight-repository document data-structure 424 comprises a plurality of data fields such as:

use_case: String
    type_of_insight: String advisor: String
clients: Array
created_date: Datetime The use-case document data-structure 426 comprises a plurality of data fields such as:

Id: <ObjectId>
name: String
type: String
url: String
scheduler: String
created_date: Datetime The advisor document data-structure 428 comprises a plurality of data fields such as:

Id: <ObjectId>
clients: Array
email: String
name: String
created_date: Datetime

Figure 8:
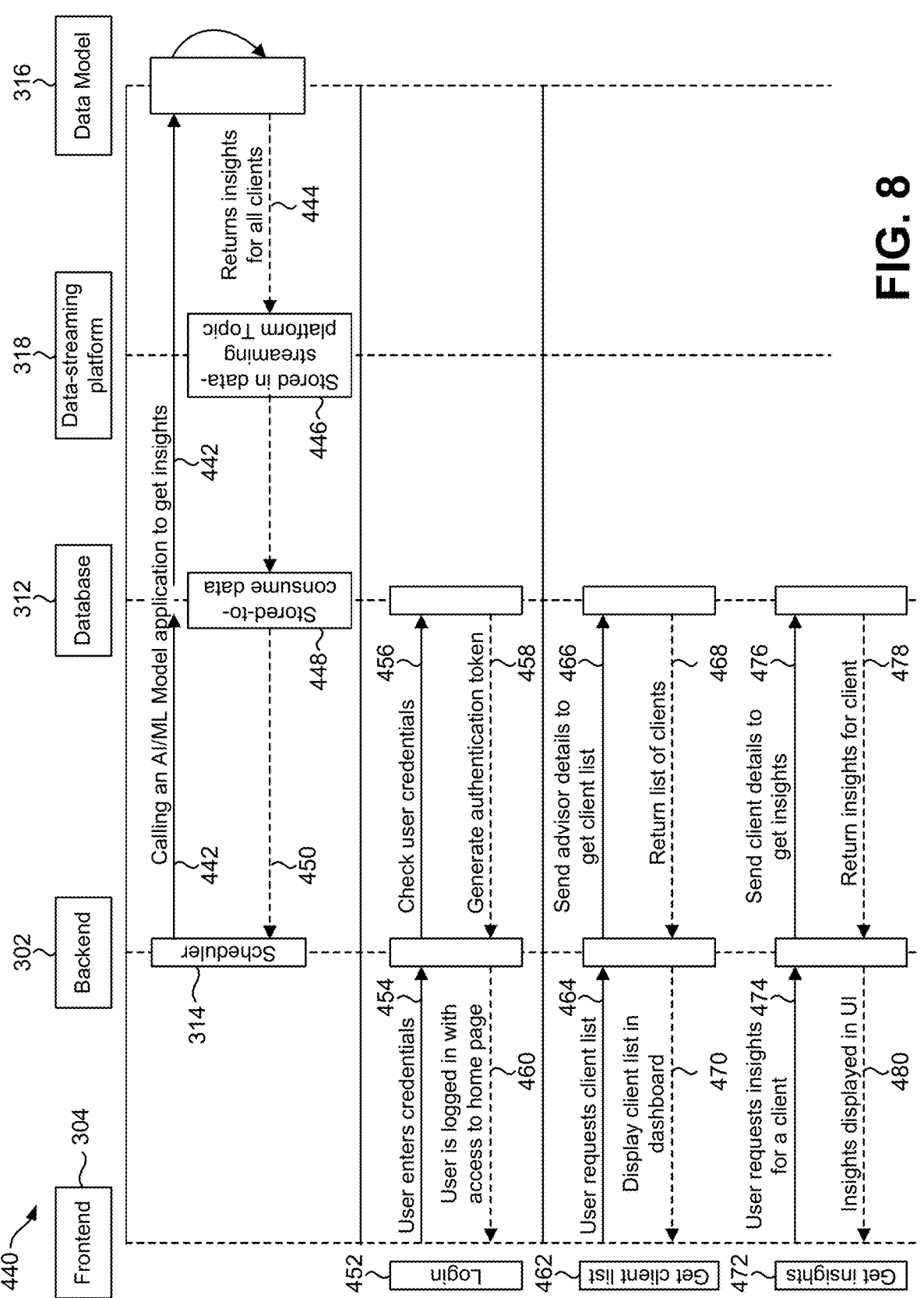
FIG. 8 is a sequence diagram showing the steps of an insights generation and query procedure executed by the computer network system shown in FIG. 1.

The client-document data-structure 430 comprises a plurality of data fields such as:

Id: <ObjectId>
client_id: String
name: String
gender: String
advisor: <ObjectId>
annual_income: Number
fxd_net_worth_amt: Number
lqd_net_worth_amt: Number
owned_total_mv_amt: Number
branch: String
Ia_code: String
account_number: String
non_rb_name: String
notrbc: String
created_date: Datetime FIG. 8 is a sequence diagram showing the steps of an insights generation and query procedure 440 executed by the computer network system 100.

When the insight generation and query procedure 440 starts, the scheduler 314 of the back-end 302 schedules the execution of insights generation. More specifically, at a scheduled time, the scheduler 314 calls the ML engine 316 to generate insights using data stored in the database 312 (step 442).

As described above, the ML engine 316 uses a content-based recommendation model comprising a trained clustering model 362 and a plurality of trained random-forest classifiers 364 for generating insights for various use cases, wherein each random-forest classifier 364 corresponds to a financial-solution category (such as banking, tax-free savings account, or the like).

The clustering model 362 uses a k-means clustering method for regulating the amount of clusters, and uses the elbow method for obtaining the proper k-value and overall cluster information. As those skilled in the art understand, the k-means clustering method is a vector-quantization method for partitioning n inputs (denoted "observations") into k clusters in which each observation belongs to the cluster with the nearest mean (with respect to the cluster center). The elbow method is a heuristic method for determining the number of clusters in a data set.

By using the clustering model 362, the ML engine 316 groups various clients into two clusters (that is, binary clustering) based on the numerical values of the client's data in the use case such as net worth, market value, household balance, age, income, and/or the like. The two clusters are:

Cluster I: potential clients of financial solutions; and

Cluster II: clients not ready for financial solutions.

Clients of cluster I is then sent to the plurality of random-forest classifiers 364 for further classification. For example, in some embodiments, three random-forest classifiers 364 are used for classifying clients of cluster I into three banking-solution categories: personal banking, premier banking, and regular banking. Each random-forest classifier 364 performs a binary classification for its corresponding banking-solution category, which classifies the clients of cluster I into:

Classification I: potential clients for the corresponding banking-solution category; and Classification II: clients not ready for the corresponding banking-solution category.

The random-forest classifiers 364 then output their classification-I clients, which may be further processed as needed and combined as an insight for the use case.

At step 444, the generated insights are sent from the ML engine 316 to the data-streaming platform 318 for storing under various topics 330. The generated insights are also sent to the database 312 for storing as consumer data (step 448). A message is also sent to the scheduler 314 to inform the scheduler that the (re)generation of insights is completed (step 450).

A user such as a financial advisor may query an insight. As shown in FIG. 8, the user first goes through a login procedure 452. At this stage, the user visits the front-end 304 and enters the user's credentials (step 454), which is sent to the back-end 302. The back-end 302 checks the user's credentials using the user's information stored in the database 312 (step 456). Once the user's credentials are successfully verified, an authentication token is generated and is sent from the database 312 to the back-end 302 (step 458). The back-end 302 then allows the user to log in with access to a home page (step 460).

After login, the user may go through a get-client-list procedure 462 by sending a client-list request from the front-end 304 to the back-end 302 (step 464). The back-end sends the user's details to the database 312 to get or otherwise retrieve the client list (step 466). The database 312 then returns a list of clients to the back-end 302 (step 468) and the back-end 302 forwards the list of clients to the front-end 304 for displaying the list of clients in the user's dashboard (step 470).

The user may also go through a get-insights procedure 4672 by sending from the front-end 304 to the back-end 302 a request for getting insights for a client (step 474). The back-end 302 then sends the client's details to the database 312 (step 476). The database 312 retrieves the client's insights from the stored consumer data and sends the retrieved insights to the back-end 302 (step 478). The back-end 302 then forwards the client's insights to the front-end 304 for displaying in a suitable UI (step 480).

Figure 9:
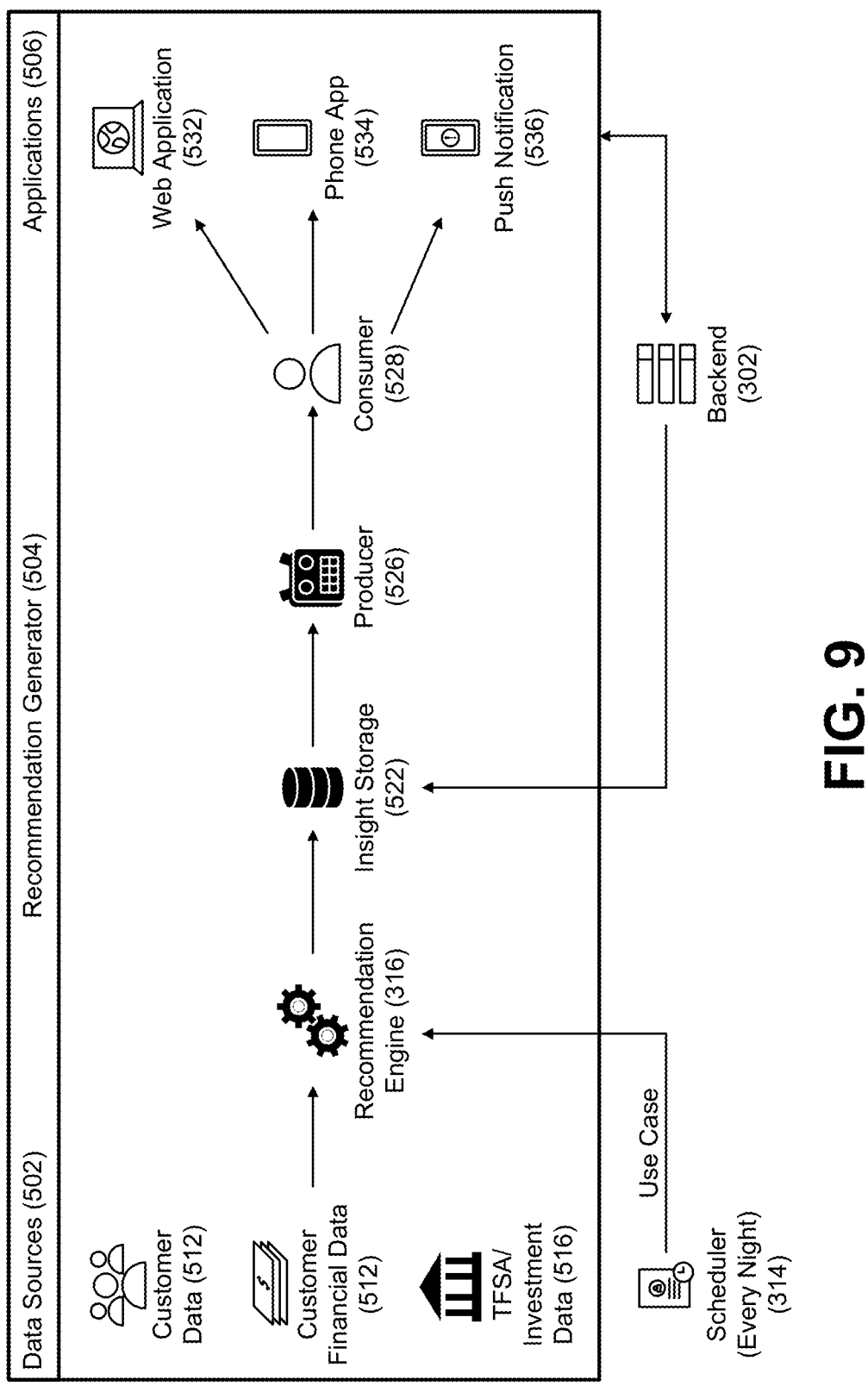
FIG. 9 is a schematic diagram showing the flow of a use case.

As an example, FIG. 9 shows the flow of a use case. As shown, the data sources 502 include the client's data 512, the client's financial data 514, and the TFSA/investment data 516. The data sources 502 are stored in the database 312 and are retrieved to the recommendation generator 504. More specifically, the data sources 502 are retrieved to the ML engine 316 (also denoted the "recommendation engine") for generating insights for the use case under the scheduling (for example, every night) of the scheduler 314. The generated insights are stored in an insight storage 522 which may be the data-streaming platform 318 of the back-end 302. In response to an insight query, the queried insight is sent as a data stream 524 to a producer 526 which publishes the queried insight in a suitable format to the applications 506 of a user 528 (such as a financial advisor; also denote a "consumer"). Depending on the applications 506 the user is using, the queried insight may be published to the user's web application 532, phone app 534, or as a push notification 536.

Figure 10:
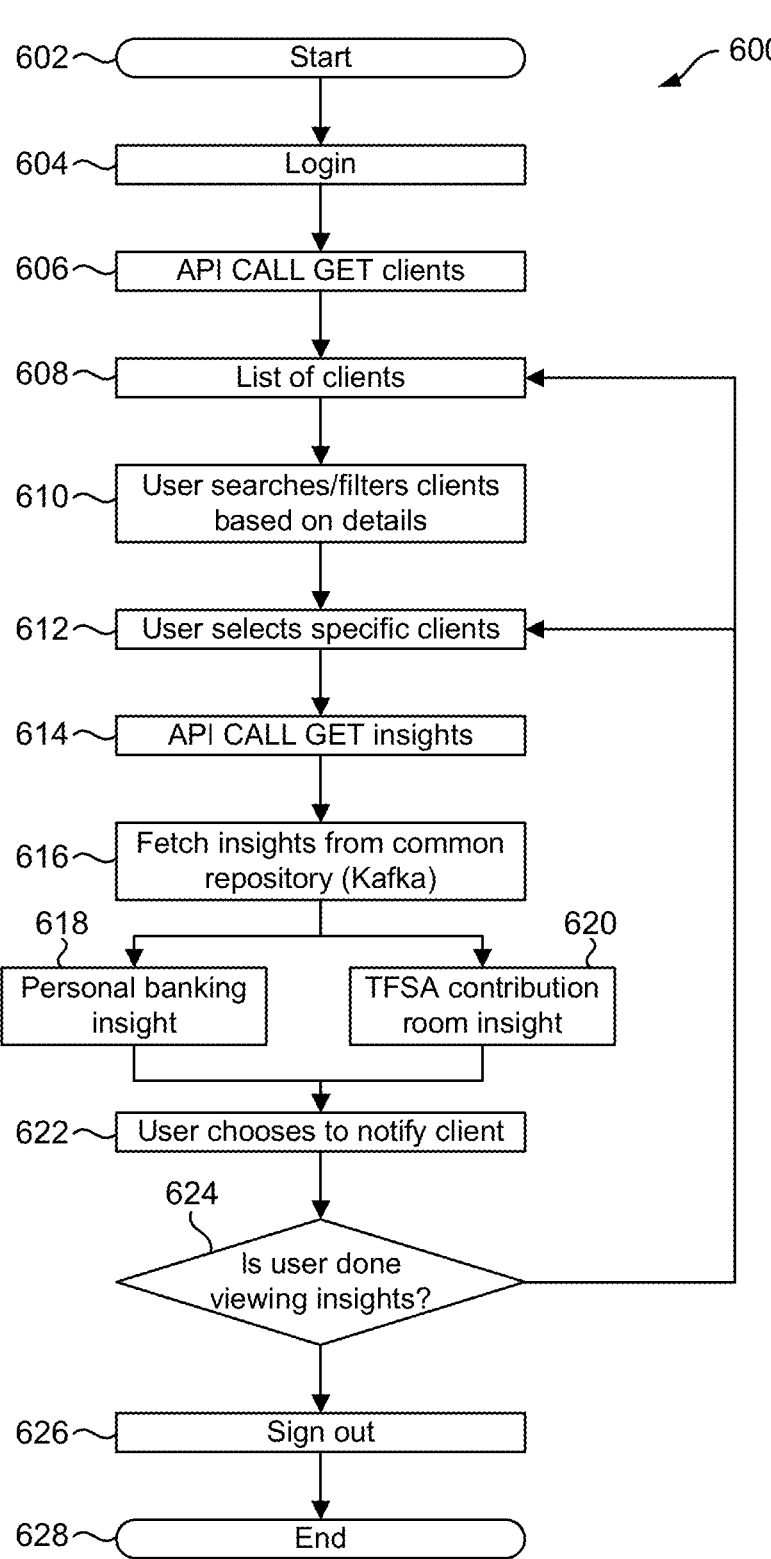
FIG. 10 is a flowchart showing the steps of an insight query procedure executed by the front-end of the computer network system shown in FIG. 1 for a user to query the insights for a client.

FIG. 10 is a flowchart showing the steps of an insight query procedure 600 executed by the front-end 304 for a user (such as a financial advisor) to query the insights for a client, which will be described with reference to the screenshots shown in FIGS. 11 to 17.

Figures 11, 12:
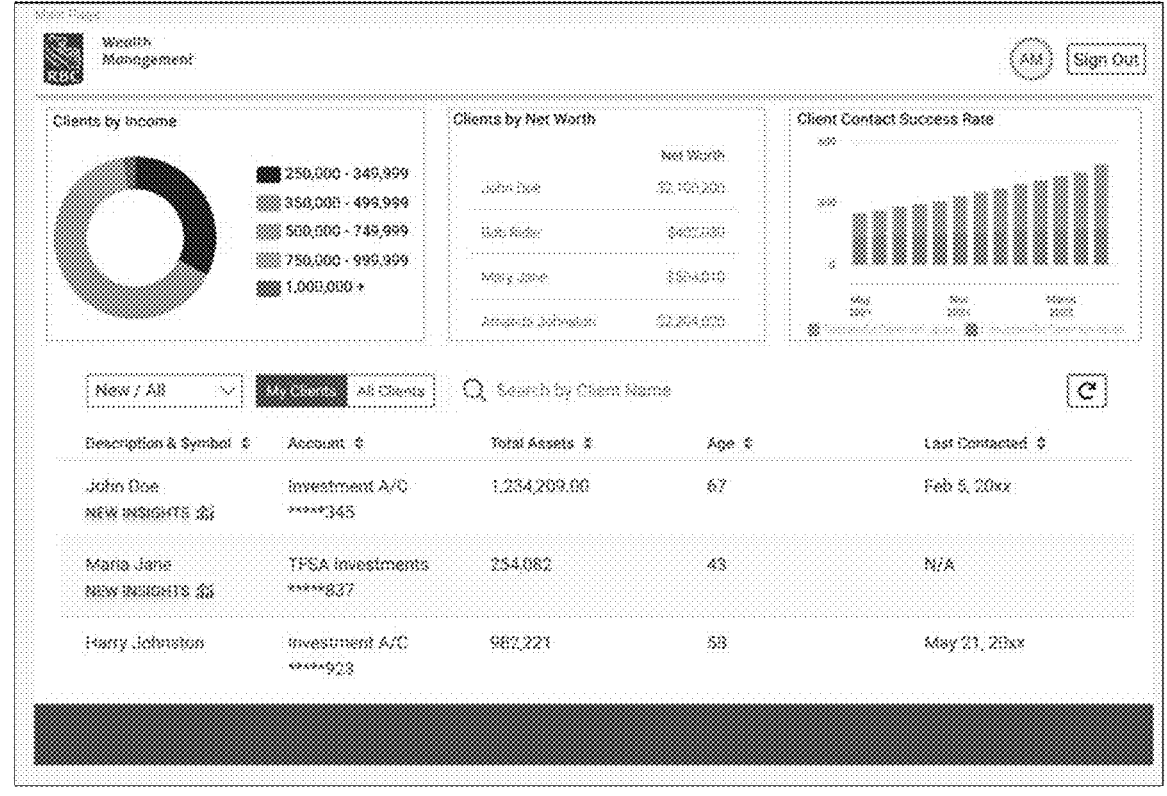
FIGS. 11 to 17 are screenshots of the screen of a user's device displayed at various steps of the insight query procedure shown in FIG. 10.
Figure 13:
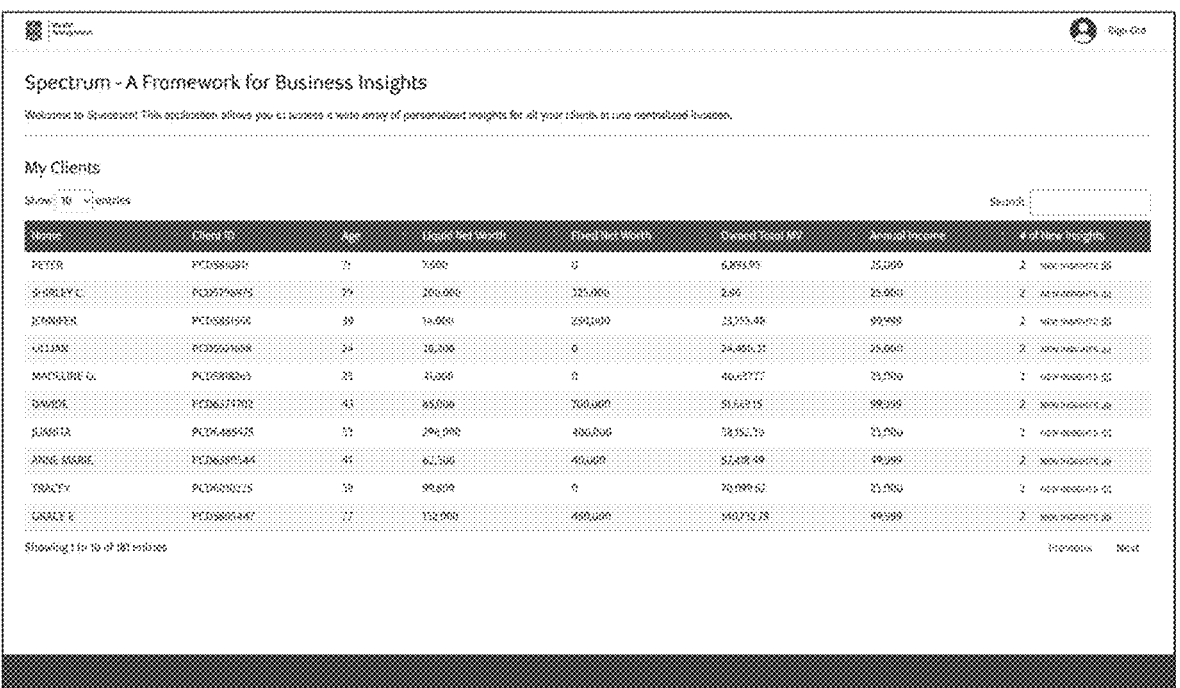
Figure 14:
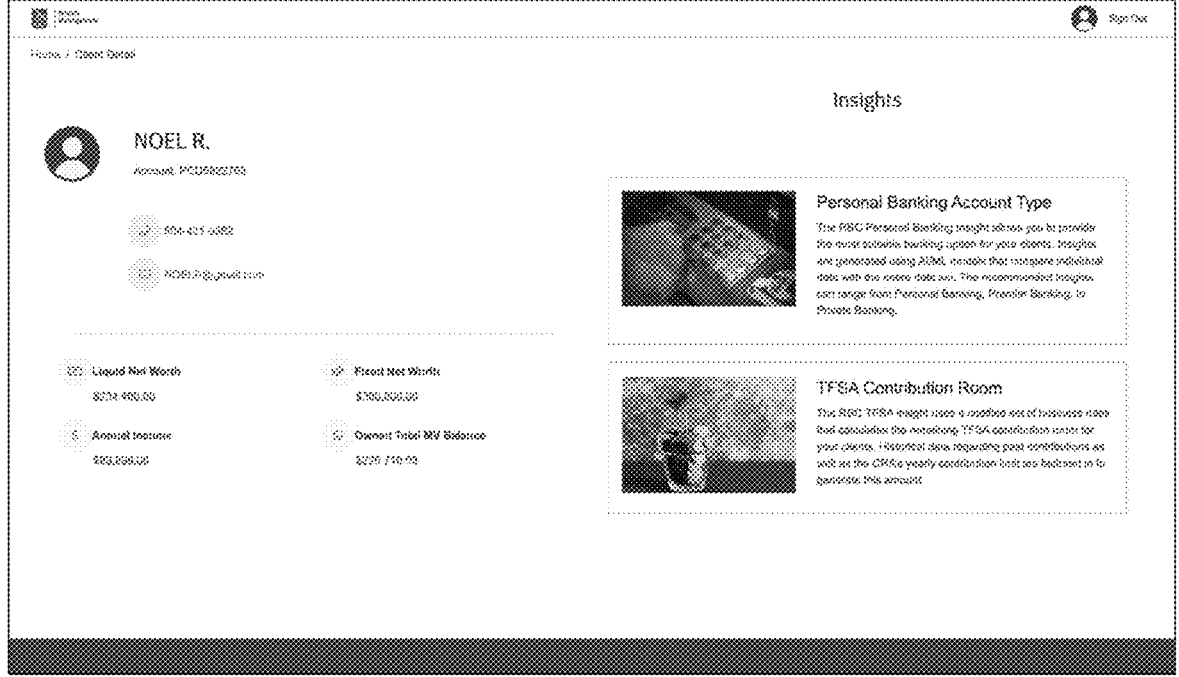
Figures 15, 16:
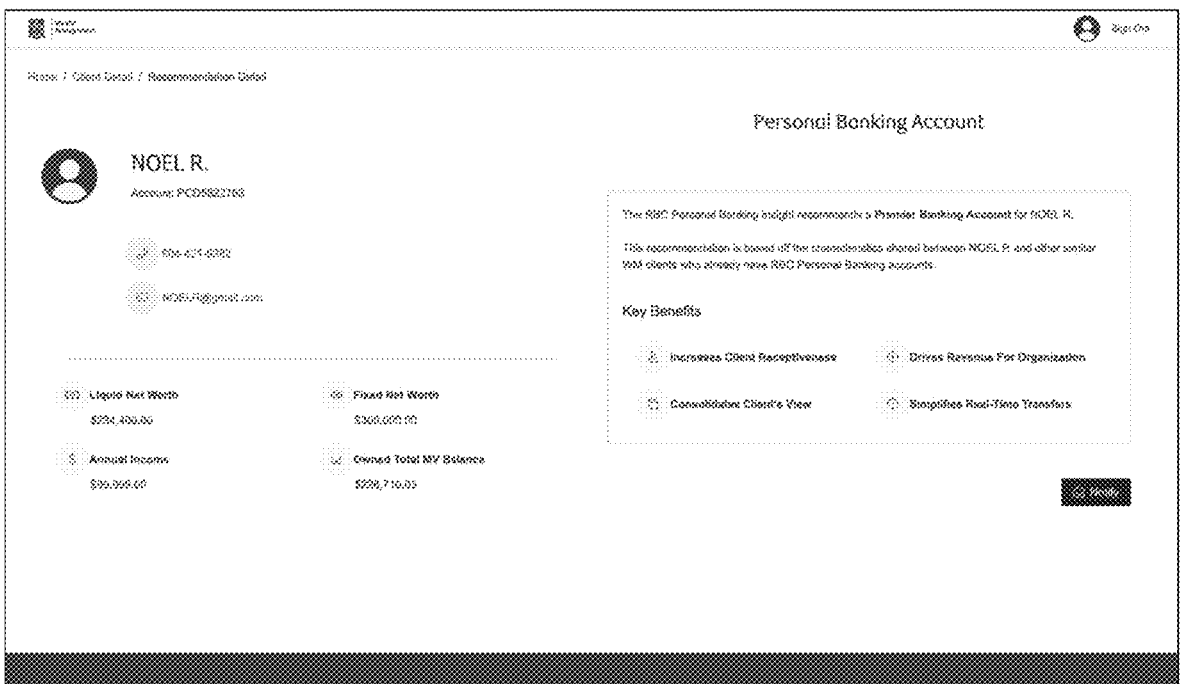

When the procedure 600 starts (step 602), the front-end 304 executes a login step 604 (see FIG. 11) to allow the user to access client's data. The user may query a list of clients by sending an API call of GET Clients (step 606). The returned list of clients 608 may be displayed on the user's device 104 in various formats as shown in FIGS. 12 and 13.

The user may search or filter clients based on some details (step 610), and may select specific clients (step 612). The details of the selected clients are then retrieved. Moreover, an API call of GET Insights is sent to the back-end 302 (step 614), and the back-end 302 fetches the queried insights from the common repository such as the data-streaming platform 318 (step 616). The details of the selected clients and the queried insights are then displayed on the user's device 104 (see FIG. 14). The user may choose to view the details of the queried insights such as the details of the personal banking insight 618 (see FIG. 15) and the TFSA contribution room insight 620 (see FIG. 16).

Figure 17:
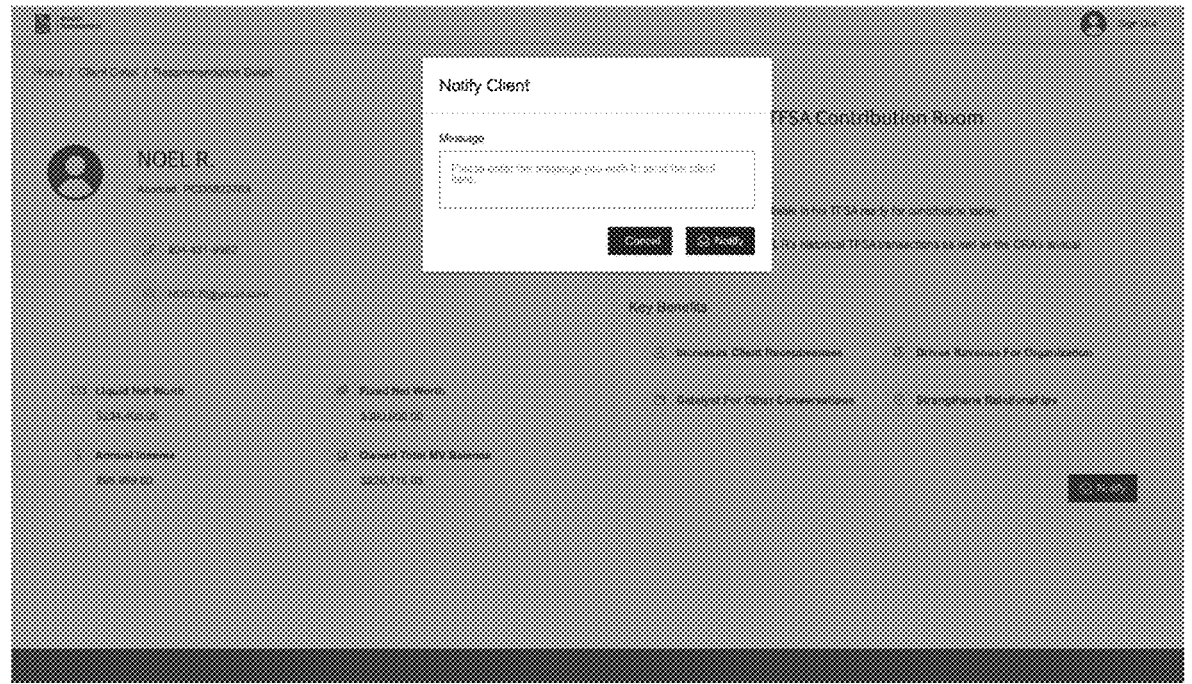

The user may then choose to notify the client regarding the client's insights (step 622). FIG. 17 is the screenshot showing the dialog for the user to enter a message to the client.

At step 624, if the user has not finished viewing the insights, the user may, for example, go back to step 608 to view the list of clients or go back to step 612 to select other clients. If at step 624, the user has finished viewing the insights, the user may sign out (step 626) and the procedure 600 ends (step 628).

Those skilled in the art will appreciate that the computer network system 100 disclosed herein automatically generates insights thereby making the process of gathering information from the advisor's perspective more effective and efficient. The computer network system 100 disclosed herein significantly reduces the time that advisors may otherwise spend for manually gathering research and information about their clients by actively displaying information they would otherwise spend time searching therefor. As those skilled in the art will understand, due to the complexity of the AI engines and models, and due to the large amount of data for training the AI models, the AI-based neighborhoods recommendation methods disclosed herein cannot be manually performed and a computer system is generally required.

The computer network system 100 disclosed herein establishes a framework for various teams and/or organizations to publish and consume insights in a standardized manner for streamlining the process of adding and displaying new business insights.

Instead of having a simple end-to-end web application that is only capable of displaying the insights it generates, the computer network system 100 disclosed herein also lays the groundwork for a framework which allows numerous back-end systems to publish their generated insights to a standardized platform for consumption.

The computer network system 100 disclosed herein allows existing or new front-end applications to easily get insights from a wide variety of sources without needing to connect with each of them individually thus saving time and resources. Similarly, from the perspective of the back-end, the computer network system 100 disclosed herein saves time and effort in system development and deployment by focusing on generating quality insights.

In above embodiments, a plurality of mutually exclusive random-forest classifiers 364 (also denoted "single-label classifiers") are used wherein each is configured for a binary classification. In some embodiments, a random-forest classifier 364 outputting multiple classifications (also denoted "multi-label classifier") may be used. However, such a multi-label classifier may require large exploration-space and have high time-complexity. On the other hand, the use of a plurality of mutually exclusive random-forest classifiers 364 may readily adapt to the dataset with missing data and noise, and may give preference to hyper-parameters to optimize the model.

In some embodiments, the computer network system 100 disclosed herein may further comprise a tracking module for advisors to track their success rate after presenting insights to clients.

In some embodiments, the computer network system 100 disclosed herein may allow various users (such as users from various teams and/or organizations) to create and/or add new use cases.

In some embodiments, the computer network system 100 disclosed herein may be connected to or otherwise integrated with other front-end applications to consume the published insights.

In some embodiments, the computer network system 100 disclosed herein may comprise a prioritization module for generating important insights with high priority.

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or portion of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terminology used herein is for the purpose of describing particular embodiments only and is not intended to be limiting. Accordingly, as used herein, the singular forms "a", "an", and "the" are intended to include the plural forms as well, unless the context clearly indicates otherwise (e.g., a reference in the claims to "a challenge" or "the challenge" does not exclude embodiments in which multiple challenges are used). It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "connect" and variants of it such as "connected", "connects", and "connecting" as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections. The term "and/or" as used herein in conjunction with a list means any one or more items from that list. For example, "A, B, and/or C" means "any one or more of A, B, and C".

It is contemplated that any part of any aspect or embodiment discussed in this specification can be implemented or combined with any part of any other aspect or embodiment discussed in this specification.

The scope of the claims should not be limited by the embodiments set forth in the above examples, but should be given the broadest interpretation consistent with the description as a whole.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A computerized method comprising:

using a trained artificial intelligence (AI) clustering model to partition a plurality of clients, based on data of the plurality of clients, into a plurality of client clusters;

classifying the clients of at least a first client cluster of the plurality of client clusters partitioned by the trained AI clustering model into a plurality of client classifications by using a plurality of mutually exclusive random-forest classifiers, wherein each of the plurality of mutually exclusive random-forest classifiers is respectively trained for classifying the clients of the at least first client cluster into a plurality of classifications with respect to a financial-solution category;

automatically generating, according to a scheduler an insight for the clients of at least a first client classification of the plurality of client classifications based on the classification with respect to the financial-solution category;

storing the insight in a database in association with the clients of the first client classification, wherein the insight is stored under one or more topics for publishing to users;

receiving a query from a user device for the insight; and retrieving the insight from the database and publishing the insight to an application of the user device.

2. The computerized method of claim 1, wherein the clustering model uses a k-means clustering method.

3. The computerized method of claim 2, wherein the clustering model uses an elbow method to obtain cluster information and obtain a k value for the k-means clustering method.

4. The computerized method of claim 1, wherein the clustering model is configured for partitioning the plurality of clients into two client clusters.

5. The computerized method of claim 4, wherein the first client cluster comprises potential clients of financial solutions.

6. The computerized method of claim 5, wherein said classifying the clients of the at least first client cluster comprises:

classifying the clients of the first client cluster into a first client classification and a second client classification by using the random-forest classifiers.

7. The computerized method of claim 6, wherein said classifying the clients of the at least first client cluster comprises:

using each of the random-forest classifiers to classify the clients of the first client cluster into the first client classification and the second client classification; and wherein the first client classification comprises potential clients for a corresponding banking-solution category, and the second client classification comprises potential clients not ready for the corresponding banking-solution category.

8. The computerized method of claim 7, wherein the random-forest classifiers comprise at least three random-forest classifiers of a personal banking category, a premier banking category, and a regular banking category, respectively.

9. One or more processors for performing actions comprising:

using a trained artificial intelligence (AI) clustering model to partition a plurality of clients, based on data of the plurality of clients, into a plurality of client clusters;

classifying the clients of at least a first client cluster of the plurality of client clusters partitioned by the trained AI clustering model into a plurality of client classifications by using a plurality of mutually exclusive random-forest classifiers, wherein each of the plurality of mutually exclusive random-forest classifiers is respectively trained for classifying the clients of the at least first client cluster based on the classification with respect to a financial-solution category;

automatically generating, according to a scheduler an insight for the clients of at least a first client classification of the plurality of client classifications based on the classification with respect to the financial-solution category;

storing the insight in a database in association with the clients of the first client classification, wherein the insight is stored under one or more topics for publishing to users;

receiving a query from a user device for the insight; and retrieving the insight from the database and publishing the insight to an application of the user device.

10. The one or more processors of claim 9, wherein the clustering model uses a k-means clustering method; and wherein the clustering model uses an elbow method to obtain cluster information and obtain a k value for the k-means clustering method.

11. The one or more processors of claim 9, wherein the clustering model is configured for partitioning the plurality of clients into two client clusters, the first client cluster comprising potential clients of financial solutions;

wherein the random-forest classifiers comprises at least three random-forest classifiers of a personal banking category, a premier banking category, and a regular banking category, respectively;

wherein said classifying the clients of the at least first client cluster comprises:

using each of the random-forest classifiers to classify the clients of the first client cluster into a first client classification and a second client classification; and wherein the first client classification comprises potential clients for a corresponding banking-solution category, and the second client classification comprises potential clients not ready for the corresponding banking-solution category.

12. One or more non-transitory computer-readable storage media comprising computer-executable instructions, wherein the instructions, when executed, cause one or more processors to perform actions comprising:

using a trained artificial intelligence (AI) clustering model to partition a plurality of clients, based on data of the plurality of clients, into a plurality of client clusters;

classifying the clients of at least a first client cluster of the plurality of client clusters partitioned by the trained AI clustering model into a plurality of client classifications by using plurality of mutually exclusive random-forest classifiers, wherein each of the plurality of mutually exclusive random-forest classifiers is respectively trained for classifying the clients of the at least first client cluster into a plurality of classifications with respect to a financial-solution category;

automatically generating, according to a scheduler, an insight for the clients of at least a first client classification of the plurality of client classifications based on the classification with respect to the financial-solution category;

storing the insight in a database in association with the clients of the first client classification, wherein the insight is stored under one or more topics for publishing to users-few receiving a query from a user device for the insight; and retrieving the insight from the database and publishing the insight to an application of the user device.

13. The one or more non-transitory computer-readable storage media of claim 12, wherein the clustering model uses a k-means clustering method.

14. The one or more non-transitory computer-readable storage media of claim 13, wherein the clustering model uses an elbow method to obtain cluster information and obtain a k value for the k-means clustering method.

15. The one or more non-transitory computer-readable storage media of claim 12, wherein the clustering model is configured for partitioning the plurality of clients into two client clusters, the first client cluster comprising potential clients of financial solutions; and wherein said classifying the clients of the at least first client cluster comprises:

classifying the clients of the first client cluster into a first client classification and a second client classification by using the random-forest classifiers.

16. The one or more non-transitory computer-readable storage media of claim 15, wherein said classifying the clients of the at least first client cluster comprises:

using each of the random-forest classifiers to classify the clients of the first client cluster into the first client classification and the second client classification; and wherein the first client classification comprises potential clients for a corresponding banking-solution category, and the second client classification comprises potential clients not ready for the corresponding banking-solution category.

17. The one or more non-transitory computer-readable storage media of claim 16, wherein the random-forest classifiers comprise at least three random-forest classifiers of a personal banking category, a premier banking category, and a regular banking category, respectively.

* * * * *